US012789517B2

(12) United States Patent
Allemand et al.

(10) Patent No.: US 12,789,517 B2
(45) Date of Patent: Nov. 10, 2026

(54) METHOD FOR ASSEMBLING AN ANTI-ADHESIVE FILM ONTO A METAL SUBSTRATE BY HOT STAMPING

(71) Applicant: SEB S.A., Ecully (FR)

(72) Inventors: Simon Allemand, Ecully Cedex (FR); Fabien Inclair, Ecully Cedex (FR); Patrice Rey, Ecully Cedex (FR); Martin Rubio, Ecully Cedex (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 19/099,520

(22) PCT Filed: Jul. 28, 2023

(86) PCT No.: PCT/FR2023/051211
§ 371 (c)(1),
(2) Date: Jan. 29, 2025

(87) PCT Pub. No.: WO2024/023474
PCT Pub. Date: Feb. 1, 2024

(65) Prior Publication Data

US 2026/0034778 A1 Feb. 5, 2026

(30) Foreign Application Priority Data

Jul. 29, 2022 (FR) .................................... 2207866

(51) Int. Cl.
*B21D 22/02* (2006.01)
*A47J 36/02* (2006.01)
(Continued)

(52) U.S. Cl.
CPC ............ *B32B 37/10* (2013.01); *A47J 36/025* (2013.01); *B21D 22/022* (2013.01); *B23P 15/00* (2013.01);
(Continued)

(58) Field of Classification Search
CPC .............................. B21D 51/22; B21D 22/022
See application file for complete search history.

(56) References Cited

U.S. PATENT DOCUMENTS

| | | | | |
|---|---|---|---|---|
| 8,257,646 | B2 * | 9/2012 | Haug | C21D 6/00<br>72/364 |
| 9,617,624 | B2 * | 4/2017 | Tanahashi | C22C 38/04 |

(Continued)

FOREIGN PATENT DOCUMENTS

| | | | | |
|---|---|---|---|---|
| AU | 1560892 A | * 11/1993 | | B32B 15/08 |
| CN | 107127238 A | * 9/2017 | | C22C 38/14 |

(Continued)

OTHER PUBLICATIONS

English Machine Translation of CN107127238A (Year: 2017).*
International Search Report for Application No. PCT/FR2023/051211 mailed Oct. 25, 2023. 4 pages.

*Primary Examiner* — Sarang Afzali
(74) *Attorney, Agent, or Firm* — Lerner David LLP

(57) ABSTRACT

A metal substrate having a face to be coated with a film is heated to a temperature between 350° C. and 550° C. A film comprising a layer containing 50-100% by weight polytetrafluoroethylene (PTFE) and 0-50% by weight of one or more thermoplastic polymers different from PTFE, the percentages being relative to the total weight of PTFE and the one or more thermoplastic polymers, is positioned such that the layer faces the heated face of the metal substrate. The metal substrate and film are then assembled by hot stamping, whereby the film is heated essentially by conduction upon contact with the metal substrate during assembly.

23 Claims, 4 Drawing Sheets

(51) Int. Cl.

| | |
|---|---|
| ***B23P 15/00*** | (2006.01) |
| ***B32B 15/085*** | (2006.01) |
| ***B32B 37/06*** | (2006.01) |
| ***B32B 37/10*** | (2006.01) |
| *B32B 15/18* | (2006.01) |
| *B32B 15/20* | (2006.01) |

(52) U.S. Cl.
CPC ............ *B32B 15/085* (2013.01); *B32B 37/06* (2013.01); *B32B 15/18* (2013.01); *B32B 15/20* (2013.01); *B32B 2311/24* (2013.01); *B32B 2311/30* (2013.01); *B32B 2509/00* (2013.01)

(56) References Cited

U.S. PATENT DOCUMENTS

| | | | | |
|---|---|---|---|---|
| 9,909,039 | B2 * | 3/2018 | Nolan | C09J 101/14 |
| 2007/0292706 | A1 * | 12/2007 | Spring | B32B 15/012 428/576 |
| 2013/0205864 | A1 * | 8/2013 | Young | B21D 22/02 72/376 |
| 2018/0000283 | A1 | 1/2018 | Lim et al. | |
| 2018/0344082 | A1 | 12/2018 | Lim et al. | |
| 2021/0114364 | A1 * | 4/2021 | Suzuki | B32B 18/00 |

FOREIGN PATENT DOCUMENTS

| | | | |
|---|---|---|---|
| EP | 3266353 | A2 | 1/2018 |
| EP | 3387967 | A1 | 10/2018 |
| JP | 3409044 | B1 | 5/2003 |
| KR | 101557713 | B1 | 10/2015 |
| KR | 101699541 | B1 | 2/2017 |
| WO | 9311935 | A1 | 6/1993 |

* cited by examiner

[Fig. 1]
[Fig. 2]
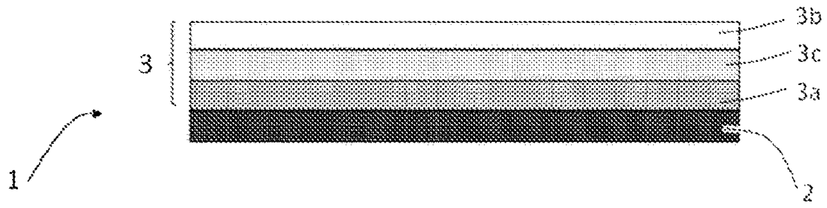
[Fig. 3]
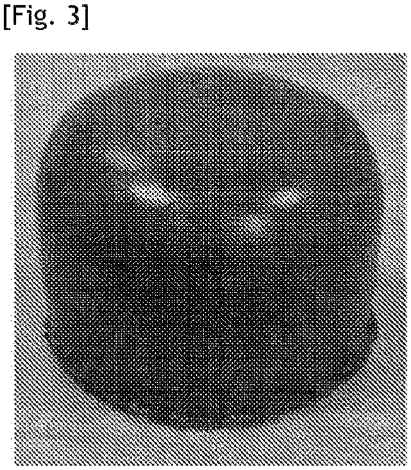

[Fig. 4]
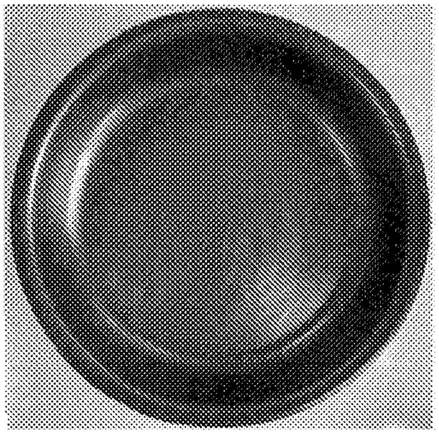
[Fig. 5]
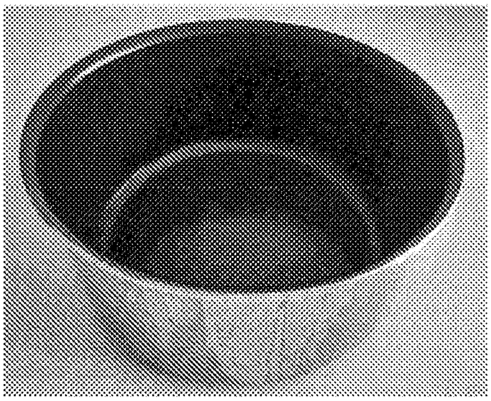

METHOD FOR ASSEMBLING AN ANTI-ADHESIVE FILM ONTO A METAL SUBSTRATE BY HOT STAMPING

CROSS-REFERENCE TO RELATED PATENT APPLICATIONS

The present application is a national phase entry under 35 U.S.C. § 371 of International Application No. PCT/FR2023/051211, filed Jul. 28, 2023, published in French, which claims priority from French Application No. 2207866, filed Jul. 29, 2022, all the disclosures of which are incorporated herein by reference.

FIELD OF THE INVENTION

The present invention relates to the field of methods for obtaining cooking elements coated with an anti-adhesive polymer film.

STATE OF THE ART

In the industry of culinary items comprising an anti-adhesive cooking surface, the performance of anti-adhesive coatings and the development of methods for obtaining such coatings are important concerns.

Conventionally, a metal substrate is first shaped to form a kitchen utensil, then the inner surface of the kitchen utensil is coated with a fluororesin having excellent heat resistance such as polytetrafluoroethylene (PTFE) or tetrafluoroethylene-perfluoroalkyl vinylether (PFA) by means of a liquid spray coating method or a powder coating method. An alternative is to coat the substrate then shape the substrate thus coated.

The liquid spray coating method has a number of disadvantages. When the metal substrate has a curved shape, it is difficult to obtain a uniform coating thickness. The liquid spray coating method also involves the use of solvents or volatile organic compounds that evaporate during the process and must be recovered and recycled. From an environmental point of view, a solvent-free and volatile organic compound-free method is preferred. On the other hand, the coating thickness is limited. Cracking is likely to occur when the coating thickness is too thick.

The powder coating method also has disadvantages. The resulting coating has pinhead-type defects that can lead to a reduction in anti-adhesive properties.

The coatings obtained according to these two methods may have significant surface roughness which can cause cleaning problems, as some cooking residues may persist on the surface of the coating even after several washes.

In order to overcome the above-mentioned disadvantages, the state of the art describes metal substrates coated with fluorinated films by lamination.

Patent application KR20150030719 KR101557713 describes a kitchen utensil comprising a body including a metal substrate on which a film of a fluorinated resin is laminated. A method for obtaining a kitchen utensil is also described. In example 1, a PTFE multilayer film is used without information on the nature of the layers. The operation of laminating the film on the substrate is not described.

Application KR101699541 describes the method for obtaining a metal substrate coated with a fluorinated film (devoid of a primer layer comprising an organic compound or an adhesive). The fluorinated film is a multilayer film obtained by successive deposition on a support of an aqueous dispersion of the constituents of the layer (fluorinated resin and optionally an inorganic filler) which is dried and sintered. The multilayer film is then removed from its support and positioned on the metal substrate before assembly. The layer of the fluorinated film in contact with the metal is made of PTFE and a resin selected from FEP, PFA, TFM, MFA (or a mixture thereof) which has good flow properties, thus allowing good adhesion, which is not allowed by PTFE. The metal substrate/fluorinated film assembly is carried out by thermal compression, in a static press or between rollers (roll-to-roll method). In the static assembly method, both the substrate and the film are heated to a temperature comprised between 300° C. and 410° C. with an applied pressure of 100 to 800 psi (0.7 MPa to 5.6 MPa). In the roll-to-roll assembly method (difficult to implement when the metal substrate is of significant thickness), both the substrate and the film are heated to a temperature comprised between 330° C. and 420° C. with an applied pressure comprised between 2 and 15 MPa.

In both method variants, the pressure applied during assembly is a few MPa and the implementation temperature is limited by the degradation temperature of the fluorinated film (in particular of PTFE which begins at 420° C.). The assembly rates of the polymer film and the metal substrate are therefore limited by the parameters of the assembly method.

DISCLOSURE OF THE INVENTION

From an industrial point of view, there remains a need to develop methods for assembling a polymer film onto a metal substrate that are more advantageous in terms of assembly time without causing a reduction in the quality of adhesion of said film onto said substrate and without causing degradation of said film.

The applicant has thus developed a method for manufacturing a coated cooking element by hot stamping assembly of a metal substrate and a polymer film.

SUMMARY OF THE INVENTION

The inventors have discovered that the method according to the invention allows to achieve rapid assembly between a metal substrate and a polymer film comprising mainly PTFE in the layer in contact with the metal substrate while ensuring good adhesion of the polymeric film onto said substrate.

Unlike the usual method for assembling fluoropolymer films on metal such as hot pressing, only the substrate is advantageously heated prior to assembly according to the method of the present invention. The polymer film is heated essentially by conduction when brought in contact with the substrate at the time of assembly, then is cooled due to the thermal inertia of the assembly tools which remain at a temperature lower than the heating temperature of the metal substrate.

During assembly, it is thus possible to heat very locally, in particular at the substrate-film interface, the film comprising mainly PTFE in its layer in contact with the substrate at a temperature above its melting temperature for a very short time, which does not cause degradation of the film.

The implementation of this high temperature combined with the pressure applied during the stamping allows the assembly of the polymer film and the metal substrate to be carried out in a much shorter time than according to conventional methods of assembling polymer films on metal substrates such as hot pressing.

The invention thus relates to a method for manufacturing a coated cooking element (1) comprising the following steps:

i. Providing a metal substrate (2) having a face (2*a*), to be coated with a film (3);

ii. Providing said film (3), said film (3) comprising a layer (3*a*) to be brought in contact with said face (2*a*) of said metal substrate (2), said layer (3*a*) comprising:

50-100% by weight of polytetrafluoroethylene (PTFE)

0-50% by weight of one or more thermoplastic polymers different from PTFE the percentages being relative to the total weight of PTFE and said one or more thermoplastic polymer(s);

iii. Heating said metal substrate (2);

iv. Positioning said film (3) such that layer (3*a*) faces said face (2*a*) of the metal substrate (2) heated in step iii.;

v. Assembling said metal substrate (2) and said film (3) by hot stamping, said metal substrate (2) being at a temperature between 350° C. and 550° C. at the time of assembly;

and such that the film (3) is heated essentially by conduction when brought in contact with the metal substrate (2) at the time of assembly in step (v).

The invention also relates to a method for shaping a coated cooking element (1) as described above comprising a step (a) of press-forming the coated cooking element (1) obtained at the end of step (v).

Other aspects of the invention are as described below and in the claims.

Definitions

The term "film" is understood to mean, within the meaning of the present invention, a set consisting of one or more superimposed layers to be assembled with the metal substrate. The term "film" also corresponds to said set once assembled with the metal substrate.

The term "layer" is understood to mean, within the meaning of the present invention, a continuous layer. A continuous layer (or also called a monolithic layer) is a single whole forming a total flat area completely covering the surface on which it is placed or is to be placed.

For the purposes of the present invention, the term "hot stamping" means the method for assembling the previously heated metal substrate (2) and the film (3) between a lower tool and an upper tool.

For the purposes of the present invention, the term "aluminum alloy" means an aluminum alloy of series 1000, 2000, 3000, 4000, 5000, 6000, 7000 and 8000.

DESCRIPTION OF THE FIGURES

FIG. 1 shows a sectional view of an exemplary embodiment of a coated cooking element (1), including a film (3) and a metal substrate (2), before assembly according to the method of the invention.

FIG. 2 shows a sectional view of an exemplary embodiment of a coated cooking element 10 (1) according to the method of the invention, including a film (3) and a metal substrate (2).

FIG. 3 shows a coated cooking element (1), including a film (3) and a metal substrate (2), obtained according to the method of the invention and shaped by press-forming.

FIG. 4 shows a metal substrate (2) made of hydrated brushed aluminum coated with the PTFE 0167 film according to example 1 and having undergone a press-forming operation 15 according to example 3.

FIG. 5 shows a metal substrate (2) made of hydrated brushed aluminum coated with the PTFE 0167 film according to example 1 and having undergone a press-forming-drawing operation according to example 4.

DETAILED DESCRIPTION OF THE INVENTION

Figure 6:
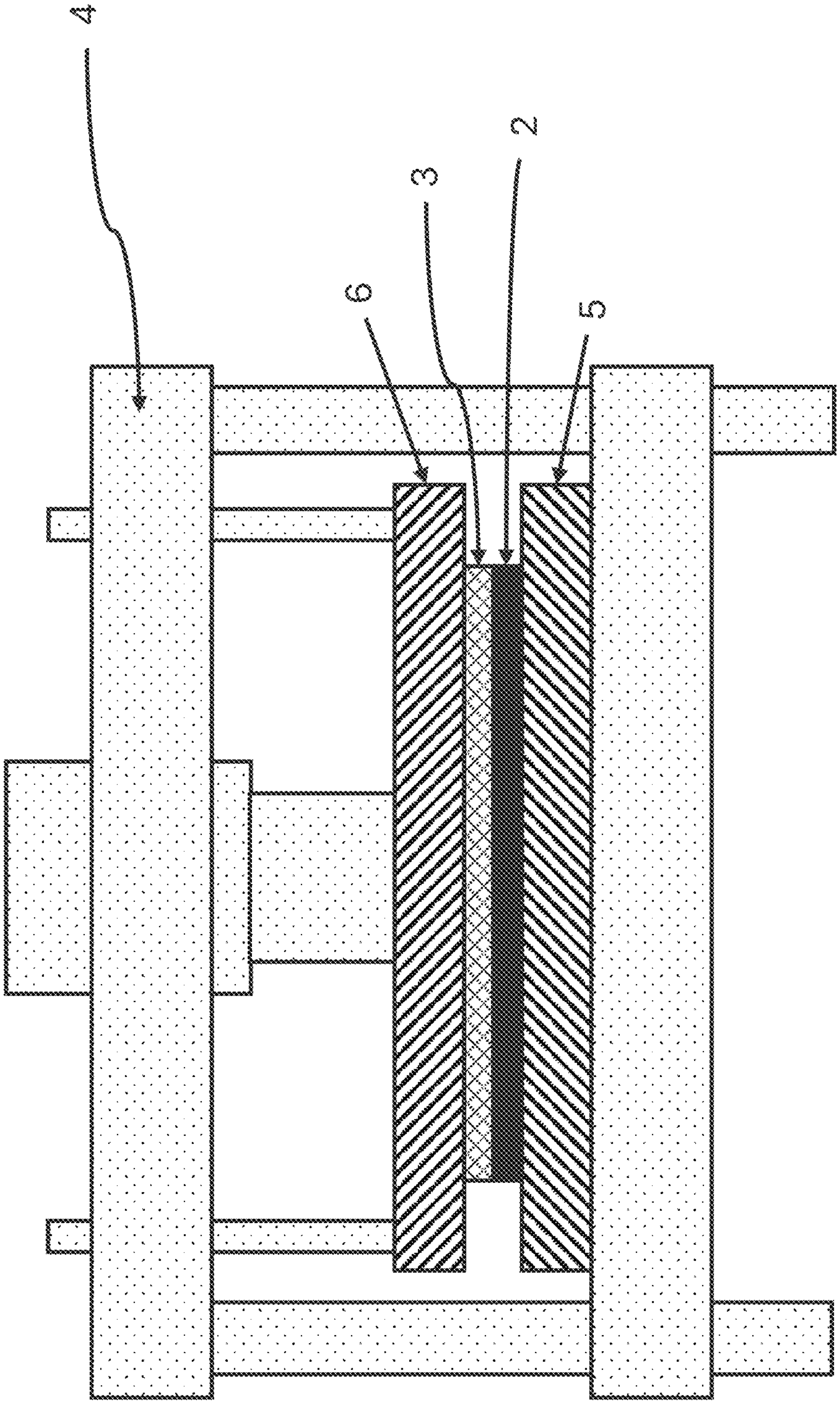
FIG. 6 shows press (4) including a lower tool (5) and an upper tool (6) between which the metal substrate (2) and the film (3) are assembled.

The inventors have developed a manufacturing method that meets the expressed needs.

The invention relates to a method for manufacturing a coated cooking element (1) comprising the following steps:

i. Providing a metal substrate (2) having a face (2*a*), to be coated with a film (3);

ii. Providing said film (3), said film (3) comprising a layer (3*a*) to be brought in contact with said face (2*a*) of said metal substrate (2), said layer (3*a*) comprising:

50-100% by weight of polytetrafluoroethylene (PTFE)

0-50% by weight of one or more thermoplastic polymers different from PTFE the percentages being relative to the total weight of PTFE and said one or more thermoplastic polymer(s);

iii. Heating said metal substrate (2);

iv. Positioning said film (3) such that layer (3*a*) faces said face (2*a*) of the metal substrate (2) heated in step iii.;

v. Assembling said metal substrate (2) and said film (3) by hot stamping, said metal substrate (2) being at a temperature between 350° C. and 550° C. at the time of assembly;

and such that the film (3) is heated essentially by conduction when brought in contact with the metal substrate (2) at the time of assembly in step (v).

Advantageously, steps i. to v. are carried out successively.

Metal Substrate (2) Used in Step i of the Method

As metal substrates (2) which can be used in the context of the invention, mention may advantageously be made of substrates made of aluminum, stainless steel, cast iron or aluminum, or titanium or copper.

For the purposes of the present invention, aluminum means a metal consisting of 100% aluminum or an aluminum alloy.

Advantageously, the metal substrate (2) is an aluminum substrate, a stainless steel substrate or a multilayer, in particular two-layer or three-layer metal substrate, these multilayers being able to be obtained for example by co-lamination, by hot diffusion under load (solid state bonding) or by hot or cold stamping (impact bonding).

Preferably, the metal substrate (2) comprises an alternation of layers of metal and/or metal alloy.

According to one embodiment, the metal substrate (2) is an aluminum alloy substrate, a stainless steel substrate or a multilayer metal substrate whose face (2*a*) is made of aluminum alloy or stainless steel.

Preferably, the metal substrate (2) is an aluminum substrate.

Advantageously, the thickness of the metal substrate (2) is comprised between 0.5 mm and 10 mm, preferably between 2 mm and 10 mm, more preferably between 2.2 mm and 10 mm, more preferably between 2.5 mm and 10 mm and even more preferably between 3 mm and 10 mm.

Advantageously, the face (2*a*) of the metal substrate (2) has undergone a surface treatment prior to assembly with the film (3) allowing to improve the adhesion of said film to said substrate.

According to one embodiment, the surface of the face (2*a*) of the metal substrate (2) has undergone a surface treatment, said surface treatment being a chemical attack, brushing, hydration, sandblasting, shot peening, a physicochemical treatment of the plasma or corona or laser type, a chemical activation or a combination of these different techniques.

Advantageously, the average arithmetic roughness Ra of the surface of the face (2*a*) of the metal substrate (2) is greater than or equal to 1 μm, preferably greater than or equal to 2 μm.

Advantageously, the average arithmetic roughness Ra of the surface of the face (2*a*) of the metal substrate (2) is less than or equal to 20 μm.

Advantageously, the average arithmetic roughness Ra of the surface of the face (2*a*) of the metal substrate (2) ranges from 2 μm to 10 μm.

The average arithmetic roughness Ra is measured using a roughness meter according to standard ISO 4287. Ra represents the arithmetic average of the deviations from the average. The surface topography can be studied in particular with a profilometer with a probe equipped with a fine stylus equipped with a diamond tip, or with an optical metrology apparatus such as Altisurf®, in which a chromatic confocal sensor allows a non-contact measurement. The study of this surface topography allows to define the average arithmetic roughness Ra.

Film (3) Used in Step ii of the Method

The adhesion of a fluorinated film to a metal substrate has technical difficulties due to the intrinsic anti-adhesive nature of fluorinated polymers: one solution consists of using a fluorinated undercoat of tetrafluoroethylene and perfluoropropylvinylether (PFA) copolymers or tetrafluoroethylene and hexafluoropropene (FEP) copolymers which acts as a hot-melt glue, thus allowing the adhesion of the fluorinated film to the metal substrate.

Direct adhesion of PTFE to a metal substrate is limited by the poor flow properties of PTFE when hot but also by its thermal degradation which occurs from 420° C.

The method according to the invention allows to overcome these difficulties and to carry out the assembly of a metal substrate (2) and a film (3) mainly comprising PTFE as polymer in the layer (3*a*) in contact with the metal substrate (2).

The film (3) used in the method according to the invention comprises a layer (3*a*) to be placed in contact with said face (2*a*) of said metal substrate (2), said layer (3*a*) mainly comprising PTFE as polymer.

The layer (3*a*) thus comprises:

- 50-100% by weight of polytetrafluoroethylene (PTFE)
- 0-50% by weight of one or more thermoplastic polymers different from PTFE the percentages being relative to the total weight of PTFE and said one or more thermoplastic polymer(s).

According to one embodiment, the PTFE polymer is the only polymer in the layer (3*a*).

When the layer (3*a*) comprises one or more thermoplastic polymers different from PTFE, this or these polymers are selected from:

- tetrafluoroethylene and perfluoropropylvinylether (PFA) copolymers, tetrafluoroethylene and hexafluoropropene (FEP) copolymers, polyvinylidene fluoride (PVDF), tetrafluoroethylene and polymethylvinylether (MVA) copolymers, tetrafluoroethylene, polymethylvinylether and fluoroalkylvinylether (TFE/PMVE/FAVE) terpolymers, ethylene tetrafluoroethylene (ETFE),
- polyarylether ketones (PAEK), including polyether ketone (PEK), polyether ether ketone (PEEK), polyether ketone ketone (PEKK), polyether ether ketone ketone (PEEKK), polyether ketone ether ketone ketone (PEKEKK), preferably polyether ether ketone (PEEK),
- polyamideimide (PAI), polyimide (PI), polyetherimide (PEI), polybenzymidazole (PBI)
- poly(phenylene oxide) (PPO), poly(arylethersulfone) (PAES) polymers including polyethersulfone (PES), polyphenylene ether sulfone (PPSU), poly(arylene sulfides) (PAS) including polyphenylene sulfide (PPS), liquid crystal polymers
- and mixtures thereof.

The film (3) may consist of a single layer (3*a*) also forming a cooking face (4).

According to another configuration, the film (3) may also comprise an additional layer positioned above the layer (3*a*) as described above. In this case, the film (3) thus further comprises another layer (3*b*) forming a cooking face (4), said other layer (3*b*) comprising one or more polymers selected from:

- polytetrafluoroethylene (PTFE), tetrafluoroethylene and perfluoropropylvinylether (PFA) copolymers, tetrafluoroethylene and hexafluoropropene (FEP) copolymers, polyvinylidene fluoride (PVDF), tetrafluoroethylene and polymethylvinylether (MVA) copolymers, tetrafluoroethylene, polymethylvinylether and fluoroalkylvinylether (TFE/PMVE/FAVE) terpolymers, ethylene tetrafluoroethylene (ETFE), and mixtures thereof; preferably PTFE
- polyarylether ketones (PAEK), including polyether ketone (PEK), polyether ether ketone (PEEK), polyether ketone ketone (PEKK), polyether ether ketone ketone (PEEKK), polyether ketone ether ketone ketone (PEKEKK), preferably polyether ether ketone (PEEK)
- polyamideimide (PAI), polyimide (PI), polyetherimide (PEI), polybenzymidazole (PBI)
- poly(phenylene oxide) (PPO), poly(arylethersulfone) (PAES) polymers including polyethersulfone (PES), polyphenylene ether sulfone (PPSU), poly(arylene sulfides) (PAS) including polyphenylene sulfide (PPS), liquid crystal polymers silicone resins
- and mixtures thereof, preferably mixtures of PTFE and PEEK.

According to one embodiment, the film (3) further comprises at least one intermediate layer (3*c*) positioned between the layer (3*a*) and the other layer (3*b*), said intermediate layer (3*c*) comprising one or more polymers selected from:

- polytetrafluoroethylene (PTFE), tetrafluoroethylene and perfluoropropylvinylether (PFA) copolymers, tetrafluoroethylene and hexafluoropropene (FEP) copolymers, polyvinylidene fluoride (PVDF), tetrafluoroethylene and polymethylvinylether (MVA) copolymers, tetrafluoroethylene, polymethylvinylether and fluoroalkylvinylether (TFE/PMVE/FAVE) terpolymers, ethylene tetrafluoroethylene (ETFE), and mixtures thereof; preferably tetrafluoroethylene and perfluoropropylvinylether (PFA) copolymers and PTFE; preferably PTFE
- polyarylether ketones (PAEK), including polyether ketone (PEK), polyether ether ketone (PEEK), polyether ketone ketone (PEKK), polyether ether ketone ketone (PEEKK), polyether ketone ether ketone ketone (PEKEKK), preferably polyether ether ketone (PEEK)

polyamideimide (PAI), polyimide (PI), polyetherimide (PEI), polybenzymidazole (PBI)

poly(phenylene oxide) (PPO), poly(arylethersulfone) (PAES) polymers including polyethersulfone (PES), polyphenylene ether sulfone (PPSU), poly(arylene sulfides) (PAS) including polyphenylene sulfide (PPS), liquid crystal polymers, silicone resins and mixtures thereof, preferably mixtures of polyarylether ketones (PAEK) and PTFE, preferably mixtures of PEEK and PTFE;

PTFE being particularly preferred.

Silicone Resins

In the description text, the expression “silicone resin” is used interchangeably to refer to the silicone before its crosslinking or after its crosslinking. In the text of the description, the expression “silicone” designates an organopolysiloxane material. Crosslinking is the step which allows to transform the silicone into an insoluble material, for example by polyaddition, polycondensation or dehydrogenation. Crosslinking is carried out from precursors which are generally silicone oils or resins, which crosslink to obtain a three-dimensional array forming a material called silicone resin, in the description.

This crosslinking can be done by thermal activation, or chemical activation using a catalyst, such as platinum.

Silicone resins can be obtained from precursors, advantageously soluble in a solvent or in emulsion in water, such as oils or crosslinkable resins, in particular selected from: a silicone hydride, a silicone oil resin comprising at least one vinyl group ($—CH=CH_2$), a silicone or silicone-polyester resin (copolymer) comprising at least one alkoxy group, for example methoxy or ethoxy, and/or a silicone or silicone-polyester resin (copolymer) comprising at least one alkoxy group, in particular ethoxy, or a hydroxy group and mixtures thereof. These precursors have the ability to crosslink in order to obtain a silicone resin which is characterized by its insolubility and its substantially solid form.

Advantageously, these precursors are polymeric or oligomeric, either in the form of silicone oils with a variable degree of branching, or in the form of silicone resins with a variable degree of pre-crosslinking or silicone resin copolymers such as silicone-polyester, silicone-alkyd, silicone-polyurethane, silicone-epoxy resins, or in the form of a mixture of silicone oils, silicone resins and silicone resin copolymers. The silicon atoms may be substituted by alkyl (in particular methyl) or aryl (in particular phenyl) groups or mixtures thereof. The oils or resins preferably comprise one or more (2, 3 or more) hydroxy or alkoxy (in particular methoxy, ethoxy, butoxy) functional groups as substituents of silicon atoms.

Advantageously, the silicone resin(s), obtained after crosslinking of their precursors, that is to say crosslinked, is/are selected from the group consisting of methyl silicone and/or phenyl silicone and/or methyl-phenyl-silicone resins, methyl silicone-polyester resin (copolymers), phenyl silicone-polyester resin (copolymers), methyl-phenyl silicone-polyester resin (copolymers), silicone-alkyd resin (copolymers), modified silicone resin and mixtures thereof.

Advantageously, the silicone resin(s) is/are selected from the group consisting of methyl silicone and/or phenyl silicone and/or methyl-phenyl-silicone resins, methyl silicone-polyester resin (copolymers), phenyl silicone-polyester resin (copolymers), methyl-phenyl silicone-polyester resin (copolymers), silicone-alkyd resin (copolymers), modified silicone resin and mixtures thereof.

Silicone resins can be obtained from precursors, in particular selected from a silicone hydride, a silicone resin comprising at least one vinyl group ($—CH=CH_2$), a silicone-polyester resin (copolymer) comprising at least one methoxy group, and/or a silicone-polyester resin (copolymer) comprising at least one ethoxy group, and mixtures thereof.

The silicone resin of the single layer (3) forms an array which can be made up of a combination of 4 simple organosiloxane units named M, D, T and Q depending on the degree of substitution by oxygen of the silicon atom, as described in the following table, where R is an organic substituent described below.

| Structure | Degree of substitution by oxygen | Symbol |
| --- | --- | --- |
| $R_3Si—O—$ | 1 | M |
| 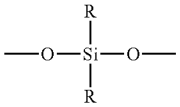 | 2 | D |
| 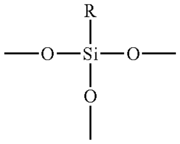 | 3 | T |
| 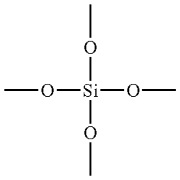 | 4 | Q |

The organopolysiloxane material or polymer is obtained by crosslinking from precursors which can be monomeric or polymeric, or intermediately which can be oligomeric. The organopolysiloxane polymer can also be obtained from a mixture of these different types of precursors. When the array contains a higher number of units T and Q than D, the crosslinking density is higher. The distribution between the units M, D, T and Q depends on the chemical structure of the precursors, in particular on this M, D, T, Q distribution within the precursors.

The polymeric precursors are organopolysiloxanes. These macromolecules are formed of units M, D, T, and/or Q as described in the table, where R is independently an alkyl group, in particular methyl, or aryl, in particular phenyl, different natures of R being able to be present on the same macromolecule.

Organopolysiloxanes can be either linear or slightly branched (majority of groups D), or branched or highly branched (majority of groups T and Q). Linear or slightly branched organopolysiloxanes are generally liquid, more or less viscous at room temperature, and are called silicone oils. Branched or highly branched (pre-crosslinked) organopolysiloxanes form an array at the scale of the individual macromolecule and are called silicone resins. At room temperature, the resins are substantially in solid form, or in liquid form provided in particular that they have a fairly low molecular weight, in the form of a solution in a solvent or in the form of an aqueous emulsion. They can be copolymerized with organic polymers or oligomers not containing silicon, chosen in particular from polyesters, acrylics, alkyds, polyurethanes, epoxy resins.

When the crosslinking is a hydrolysis-polycondensation: it is carried out thanks to the reactive hydroxy or alkoxy, in particular methoxy, ethoxy or butoxy functions, present on the organopolysiloxane.

When the crosslinking is a polyaddition (or hydrosilylation): it is carried out by reaction between the reactive vinyl functions (—CH═$CH_2$) present on one of the organopolysiloxanes and the reactive silyl hydride functions (Si—H) present on the other organopolysiloxane mixed with the first.

All these reactive functions are present on each organopolysiloxane in the number of at least one and can be present in the number of 2, 3, or more . . . as much as the molecular structure allows. Silicone oils including at least one reactive function are called "reactive oils". The reactive functions can be found either at the end of the macromolecular chain (termination), or distributed over the chain.

Silicone-polyester resins in particular have silicone/polyester mass ratios of, for example, 90/10, 80/20, 70/30, 60/40, 50/50, 40/50, 30/70, 20/80, 10/90, advantageously between 80/20 and 50/50.

Linear PDMS silicone oils, pure or pre-emulsified in water, are characterized firstly by their molecular mass, which is a direct increasing function of the viscosity of the pure oil. They are then characterized by the presence or absence of reactive functions, for example hydroxyls on the silicon atoms (silanol), their number and their location on the molecular chain. For example, use can be made of reactive oils with viscosities between 50 and 20000 mPa·s, and in particular between 300 and 5000 mPa·s, having at least one reactive function, preferably at least 2, which can be placed at the end of the chain.

Polymer precursors reacting by polyaddition may include for example polymethylhydrosiloxane, vinylmethylsiloxane, vinyl terminated polydimethylsiloxane (PDMS) which is in particular linear, vinyl terminated diphenylsiloxane-dimethylsiloxane copolymers, hydride terminated polydimethylsiloxanes, hydride terminated polyphenylmethylsiloxanes, cyclic vinylmethylsiloxane, vinyl-MQ resin, trimethylsilyl terminated polymethylhydrosiloxane, dimethylsiloxane terminated methylhydrosiloxane and trimethylsiloxane copolymer, MQ resin hydride, and the like, as well as combinations thereof.

Polymeric precursors reacting by hydrolysis-polycondensation, whether silicone resins or silicone oils, can include for example poly(methylsilsesquioxanes), poly(propylsilsesquioxanes), poly(phenylsilsesquioxanes), polydimethylsiloxane (PDMS), trimethylsilyl terminated polydimethylsiloxane (PDMS), hydroxyl terminated polydimethylsiloxane (PDMS), silanol terminated polydimethylsiloxane (PDMS), silanol terminated polyphenylsiloxane (PDMS), silanol terminated diphenylsiloxane-dimethylsiloxane copolymer, poly(2-acetoxyethylsilsesquioxanes), organo-modified alkoxy-silanes and their oligomers, and all similar macromolecules as well as mixtures thereof.

The organopolysiloxane material or polymer may also be obtained by crosslinking a mixture of one or more monomeric precursors and one or more polymeric precursors as described above, as well as one or more oligomeric precursors which may be linear, branched or cyclic. These oligomeric precursors have a lower molecular weight than the polymeric precursors. Polymeric and/or oligomeric precursors including a number of reactive functions as described above greater than 2, advantageously much greater than 2, may be added to the mixture as a "co-binder" in order to promote a high crosslinking density of the organopolysiloxane polymer finally obtained.

Monomeric, oligomeric and/or polymeric precursors, in particular silicone resins, copolymerized or not with an organic polymer, act as a polymeric binder in order to obtain the solid organopolysiloxane polymer combined with the thermoplastics of each layer.

Organopolysiloxane precursors can be considered as additives if they are added in small amounts (typically between 0.1 and 5% dry) in the overall formulation of a layer, independently of the other components for the formation of the solid organopolysiloxane polymer.

Crosslinking may require a catalyst:

- In the case of the crosslinking of organopolysiloxanes by hydrolysis-polycondensation, the formula may include a metal catalyst, such as for example metal complexes based on platinum, tin, zinc, zirconium and cerium, in particular platinum-cyclovinylmethyl-silxane complexes, tin ethylhexanoate, zinc ethylhexanoate, zirconium ethylhexanoate, cerium ethylhexanoate, and dibutyl tin laurate.
- In the case of crosslinking of organopolysiloxanes by hydrosylilation, the addition of a catalyst may be necessary: this may, for example, be platinum or a suitable platinum-based catalyst such as the Karstedt catalyst or the Ashbys catalyst.

A crosslinking agent, for example carrying Si—H bonds, may be present.

The film (3) may further comprise at least one filler and/or at least one reinforcement.

As fillers which can be used in the present invention, mention may in particular be made of metal oxides, metal carbides, metal oxynitrides, metal nitrides, silicas and mixtures thereof.

These fillers may be present in one or more layers of the film (3) or in each of the layers of the film (3).

As reinforcements that can be used under the present invention, mention may be made of a mineral or metal reinforcement of the fiber type, metal mesh, fiberglass material or fabric. The reinforcement may also consist of a non-fluorinated polymer with high thermomechanical properties of the polyaryletherketone (PEAK) type, such as for example polyetheretherketone (PEEK), or polyamide-imide (PAI). The reinforcement may be in the form of a layer of the film (3) positioned between the layer (3*a*) and the layer (3*b*) forming the cooking face.

In order to improve the adhesion of the film (3) and the metal substrate (2), the layer (3*a*) of the film (3) coming in contact with the face (2*a*) of the metal substrate (2) in step (v) may have undergone a mechanical or chemical surface treatment. This prior surface treatment may be a chemical attack, brushing, hydration, sandblasting, shot peening, a physicochemical treatment of the plasma or corona or laser type, a chemical activation or a combination of these different techniques.

According to one embodiment, the thickness of said film (3) is comprised between 5 μm and 500 μm, preferably between 25 μm and 150 μm.

The thickness of the layer(s) of the film (3) is measured at 20 random points on the section of the film. The average thickness of said film (3) is obtained by averaging these 20 measurements.

The total thickness of the film (3) of the coated cooking element (1) according to the invention, that is to say measured on the cooking element once it has been coated with the film (3), is comprised between 5 μm and 500 μm, preferably between 25 μm and 150 μm.

The measurement of the thickness of the film (3) of the coated cooking element (1) according to the invention is carried out at 20 random points on the section of the coated substrate. The average thickness of said film (3) is obtained by averaging these 20 measurements.

The film (3), before assembly with the metal substrate (2), can be obtained by depositing a first layer on a support, then possibly by the successive deposition of the other layers, then by exfoliation of said film to separate it from the support. The layers of the film (3) can also be assembled together by any other assembly method, such as by lamination for example.

Generally, the film (3) of the coated cooking element (1) completely covers the face (2*a*) of the metal substrate (2), but it can be considered that only a part of the metal substrate (2) is covered.

In the exemplary embodiment illustrated in FIGS. 1 and 2, the film (3) includes 3 layers (3*a*, 3*b*, 3*c*).

Step iii

The metal substrate (2) is heated in step iii prior to steps iv and v of the method. The metal substrate can be heated by means of any suitable equipment, in a furnace or by induction for example.

The metal substrate (2) is heated to a temperature such that its temperature at the time of assembly in step v. is between 350° C. and 550° C.

Thus, the metal substrate can be heated to a temperature between 400° C. and 600° C.

Step iv

Before assembly in step v, the film (3) is positioned above the metal substrate (2) so that its layer (3*a*) is facing the face (2*a*) of the metal substrate (2) previously heated in step iii.

The film (3) is positioned so that the entire surface of the layer (3*a*) simultaneously comes in contact with the surface of the face (2*a*) of the metal substrate (2) during the assembly step v.

In order to ensure this contact of the layer (3*a*) of the film (3) with the face (2*a*) of the metal substrate (2), the film (3) can be attached to the upper tool or be stretched between 2 rollers.

Step v

When assembling the metal substrate (2) and the film (3) by hot stamping, said metal substrate (2) is at a temperature between 350° C. and 550° C. at the time of assembly.

When the temperature is lower than 350° C., the adhesion of the film (3) to the metal substrate (2) is not sufficient.

When the temperature is higher than 550° C., a degradation of the film (3) is observed.

Advantageously, the metal substrate (2) is at a temperature between 400° C. and 500° C., preferably between 420° C. and 480° C.

The temperature of the metal substrate (2) can also be between 440° C. and 480° C.

The temperature of the metal substrate (2) at the time of assembly corresponds to the temperature of the metal substrate (2) when the stamping begins, i.e. when the pressurization of the metal substrate (2)/film (3) set begins.

Figure 7:
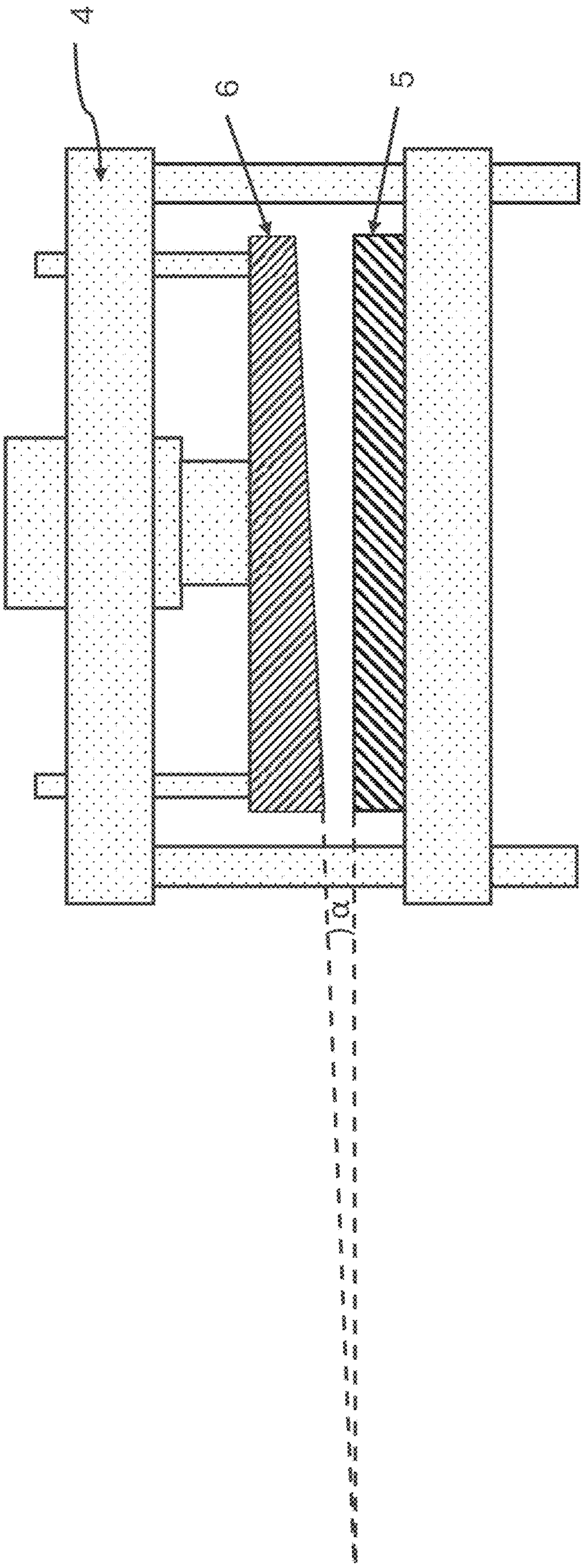
FIG. 7 shows the press (4) in which the plane of the upper surface of the lower tool, relative to the plane of the lower surface of the upper tool, has an angle α.

According to one embodiment, and as shown in FIG. 6 and FIG. 7, the assembly by hot stamping in step v. is carried out by means of a hydraulic or mechanical press (4) comprising a lower tool (5) and an upper tool (6) between which the metal substrate (2) and the film (3) are assembled, said metal substrate (2) being preferentially in contact with the lower tool (5) and said film (3) being preferentially in contact with the upper tool (6).

According to one embodiment, the assembly by hot stamping in step v. is carried out by means of a hydraulic or mechanical press comprising a lower tool and an upper tool between which the metal substrate (2) and the film (3) are assembled, said metal substrate (2) being preferentially in contact with the lower tool and said film (3) being preferentially in contact with the upper tool.

The surface of the lower tool, advantageously flat, can undergo a surface treatment so as to avoid any sticking of the metal substrate to said tool.

Advantageously, the plane of the surface of the upper tool, relative to the plane of the surface of the lower tool, has an angle comprised between 0.01° and 0.5°, preferably between 0.15° and 0.25°. This angle allows to limit the trapping of air during the assembly step.

Advantageously, the assembly tools are not heated prior to assembly step v.

Optionally, the lower tool can be heated. Optionally, the upper tool can be cooled.

According to one embodiment, the lower tool is heated to a temperature comprised between 25° C. and the temperature of the metal substrate (2) at the time of assembly and/or the upper tool is brought to a temperature comprised between 15° C. and 120° C. in step v.

Unless otherwise stated, the temperature values indicated in this application correspond to measured temperature values and are not set-point temperatures.

The temperature values are measured by any suitable means, for example by means of a temperature probe positioned on the surface or in the mass of the heated or cooled element.

The temperature of the metal substrate (2), at the time of assembly (step v), is between 350° C. and 550° C. The temperature of the metal substrate (2) at the time of assembly corresponds to the temperature of the surface (2*a*) of the metal substrate (2) when the stamping begins, that is to say, when the pressurization of the metal substrate (2)/film (3) set begins.

The temperature of the metal substrate (2) can then drop during the stamping operation, particularly when the lower tool is not heated prior to the assembly step.

During the stamping operation of step v, a pressure greater than or equal to 100 MPa, preferably several hundred MPa, is advantageously used.

According to one embodiment, the metal substrate (2) and the film (3) are maintained under a pressure comprised between 100 MPa and 800 MPa, preferably between 350 MPa and 500 MPa in step v.

The pressure applied during the stamping operation is considerably higher than that applied in conventional metal substrate/polymer film assembly methods such as hot pressing which is only a few MPa.

According to one embodiment, the duration of maintaining the metal substrate (2) and the film (3) under pressure is less than or equal to 1 minute, preferably less than or equal to 15 seconds in step v.

Stamping can be carried out by applying a sharp blow, for a duration of less than 5 seconds.

According to another embodiment, the duration of maintaining the metal substrate (2) and the film (3) under pressure is comprised between 1 second and 1 minute, preferably between 2 seconds and 15 seconds in step v.

The film (3) is essentially heated by conduction when it comes into contact at the time of assembly with the heated substrate. It is then cooled during stamping due to the thermal inertia of the assembly tools whose temperature is lower than the heating temperature of the metal substrate (2).

The temperature of the film (3) can thus drop rapidly during the stamping operation, in particular when the lower tool is not heated prior to the assembly step.

The film (3) is advantageously not heated prior to assembly step v.

According to the method of the invention, it is thus possible to heat the film (3) very locally, in particular at the metal substrate (2)-film (3) interface, to a temperature above its melting temperature for a very short time, which does not cause any degradation of the film.

Advantageously, the temperature of the film (3) at the end of step v. of assembling said film (3) and the metal substrate (2), that is to say, when the assembly of the film (3) and the metal substrate (2) is no longer maintained under pressure, is lower than the melting temperature of the PTFE.

The combination, at the time of assembly by stamping, of a temperature and a pressure as described above, allows to ensure the adhesion of the film (3) on the metal substrate (2) in very short times.

After assembly, the metal substrate (2) coated with the film (3) is left to cool to room temperature in order to obtain maximum adhesion between the film (3) and the metal substrate (2).

The metal substrate (2) coated with the film (3) can then be shaped at the end of step (v).

A second object of the invention thus relates to a method for shaping a coated cooking element as described above comprising a step (a) of press-forming the coated cooking element (1) obtained at the end of step (v).

The shaping method may further comprise a step (b) of drawing the coated cooking element (1) obtained at the end of step (a).

The adhesion of the film (3) to the metal substrate (2) before shaping must be good enough to avoid any loss of adhesion during and after the shaping operation.

The coated cooking element (1) according to the method of the invention can form a cooking container in a culinary article selected from the group consisting of saucepan, frying pan, skillets or fondue or raclette pots, stewpot, wok, sauté pan, crepe pan, grill, plancha, cooking pot, cocotte, culinary mold.

The coated cooking element (1) according to the method of the invention can form a cooking container in an electric cooking appliance selected from the group consisting of electric crepe maker, electric raclette appliance, electric fondue appliance, electric grill, electric plancha, electric cooker, cooking robot, bread maker. Thus the culinary article can form a cooking accessory for an electric cooking appliance.

The following examples are given for illustrative purposes, but should in no way be considered as limiting the present invention.

EXAMPLES

Equipment Used:

- for assembly tests: hydraulic press SGM 160 T equipped with a flat upper punch and a flat lower punch. The plane of the surface of the upper punch has an angle of 0.15° with respect to the plane of the surface of the lower punch in order not to trap air during the assembly step
- for Swift press-forming tests: Zwick BPU 400 press-forming machine Metal Substrates Used:

A metal substrate (2) made of aluminum 1200, state 0, is used for testing. The metal substrate (2) is used as is or after undergoing a surface treatment.

The following 3 configurations are tested:

- metal substrate (2) made of raw aluminum having an average arithmetic roughness Ra less than 1 μm;
- metal substrate (2) made of hydrated brushed aluminum having an average arithmetic roughness Ra between 2 μm and 3 μm;
- metal substrate (2) having an average arithmetic roughness Ra between 3 μm and 4 μm.

The average arithmetic roughness Ra is measured using an optical metrology device such as Altisurf®.

Polymeric Films Used:

The following films (3), supplied by the company Saint-Gobain, were used:

- Film (3) Chemfilm® skived PTFE 0001: colorless PTFE film with a thickness of 100 μm;
- Film (3) Chemfilm® black skived PTFE 0167: black PTFE film with a thickness of 100 μm.

Example 1: Assembly Test

Experimental Conditions:

The metal substrates (2) are cut into discs of 340 mm diameter.

The metal substrate (2) is heated in a furnace having a heating set-point temperature of 550° C.

After 15 minutes of heating, the temperature of the metal substrate (2) measured using a contact probe is 520° C.

After 15 minutes of heating, the metal substrate (2) is positioned on the unheated lower punch of the hydraulic press.

The unheated film (3) is brought in contact with the metal substrate (2) just before assembly.

The metal substrate (2) and the film (3) are assembled by sharp blow stamping with a stamping force of 3000 T (i.e. 33 $kg/mm^2$ corresponding to a pressure of 330 Mpa), the temperature of the metal substrate (2) at the time of stamping being 420° C.

Results:

After cooling, the quality of adhesion of the film (3) to the metal substrate (2) is evaluated.

The PTFE film (3) adheres strongly to the metal substrate (2) made of hydrated brushed aluminum, and to the chemically pickled aluminum metal substrate (2).

Adhesion is not satisfactory on the raw aluminum metal substrate (2).

Example 2: Swift Press-Forming Test

The hydrated brushed, pickled and coated aluminum discs according to Example 1 are subjected to a Swift press-forming test.

Experimental Conditions:

- cutting discs to a diameter of 64 mm
- 33 mm punch (Limiting Drawing Ratio=1.9)
- press-forming die: 40 mm Results:

FIG. 3 shows the metal substrate (2) made of hydrated brushed aluminum coated with the PTFE 0167 film (3) according to Example 1 and having undergone a press-forming operation.

No detachment of the film (3) is observed after shaping while the film (3) is outside the substrate.

A similar result is obtained with the PTFE 0001 film (3) and for the pickled aluminum metal substrate (2) coated with the PTFE 0167 or PTFE 0001 film (3).

Example 3: Press-Forming a Frying Pan

The hydrated brushed, pickled and coated aluminum discs according to example 1 are shaped by press-forming in the form of a 26 cm diameter pan.

Results:

FIG. 4 shows the metal substrate (2) made of hydrated brushed aluminum coated with the PTFE 0167 film according to Example 1 and having undergone a press-forming operation.

The pan was then subjected to a thermal shock test. The shell was heated to 300° C. on a gas burner then the pan was immersed in water at room temperature, this step being repeated 25 times.

No problem of film peeling (3) on the aluminum metal substrate (2) was observed.

A similar result is obtained with the PTFE 0001 film (3) and for the pickled aluminum metal substrate (2) coated with the PTFE 0167 or PTFE 0001 film (3).

Example 4: Press-Forming a Saucepan

The hydrated brushed, pickled and coated aluminum discs according to example 1 are shaped by press-forming-drawing in the form of a 20 cm diameter saucepan.

Results:

FIG. 5 shows the metal substrate (2) made of hydrated brushed aluminum coated with the PTFE 0167 film (3) according to Example 1 and having undergone a press-forming drawing.

The saucepan was then subjected to a thermal shock test. The shell was heated to 300° C. on a gas burner then the saucepan was immersed in water at room temperature, this step being repeated 25 times.

No problem of film (3) peeling on the aluminum metal substrate (2) was observed.

A similar result is obtained with the PTFE 0001 film (3) and for the pickled aluminum metal substrate (2) coated with the PTFE 0167 or PTFE 0001 film (3).

These examples illustrate the excellent adhesion between the film (3) and the metal substrate (2) after assembly, as well as the suitability for press-forming of the coated metal substrates (2) obtained according to the invention.

The invention claimed is:

1. A method for manufacturing a coated cooking element comprising the following steps:

i) providing a metal substrate having a face, to be coated with a film;

ii) providing said film, said film comprising a layer to be brought in contact with said face of said metal substrate, said layer comprising:

50-100% by weight of polytetrafluoroethylene (PTFE)

0-50% by weight of one or more thermoplastic polymers different from the PTFE, with each of the % by weight being relative to a total weight of the PTFE and said one or more thermoplastic polymer(s);

iii) heating said metal substrate;

iv) positioning said film such that the layer faces said face of the metal substrate heated in step iii; and v) assembling said metal substrate and said film by hot stamping using a hydraulic or mechanical press comprising a lower tool having an upper surface and an upper tool having a lower surface, wherein said metal substrate is in contact with the upper surface of the lower tool and said film is in contact with the lower surface of the upper tool during the assembling, and wherein said metal substrate being at a temperature between 350° C. and 550° C. during the assembling, wherein the metal substrate is heated and the film is not heated prior to the assembling in step v), wherein the film is heated by conduction when brought in contact with the heated metal substrate during the assembling in step v).

2. The method for manufacturing a coated cooking element according to claim 1, wherein the metal substrate and the film are maintained for a duration under a pressure comprised between 100 MPa and 800 MPa.

3. The method for manufacturing a coated cooking element according to claim 2, wherein the metal substrate and the film are maintained under a pressure comprised between 350 MPa and 500 MPa in step v).

4. The method for manufacturing a coated cooking element according to claim 2, wherein the duration of maintaining the metal substrate and the film under pressure is less than or equal to 1 minute in step v).

5. The method for manufacturing a coated cooking element according to claim 4, wherein the duration of maintaining the metal substrate and the film under pressure is less than or equal to 15 seconds in step v).

6. The method for manufacturing a coated cooking element according to claim 2, wherein the duration of maintaining the metal substrate and the film under pressure is comprised between 1 second and 1 minute in step v).

7. The method for manufacturing a coated cooking element according to claim 6, wherein the duration of maintaining the metal substrate and the film under pressure is comprised between 2 seconds and 15 seconds in step v).

8. The method for manufacturing a coated cooking element according to claim 1, wherein a plane of the lower surface of the upper tool, relative to a plane of the upper surface of the lower tool, has an angle comprised between 0.01° and 0.5°.

9. The method for manufacturing a coated cooking element according to claim 8, wherein the plane of the lower surface of the upper tool, relative to the plane of the upper surface of the lower tool, has an angle comprised between 0.15° and 0.25°.

10. The method for manufacturing a coated cooking element according to claim 1, wherein the lower tool is heated to a temperature comprised between 25° C. and the temperature of the metal substrate during the assembling in step v).

11. The method for manufacturing a coated cooking element according to claim 1, wherein said metal substrate is an aluminum alloy substrate, a stainless steel substrate or a multilayer metal substrate whose face is made of aluminum alloy or stainless steel.

12. The method for manufacturing a coated cooking element according to claim 1, wherein a surface of the face of the metal substrate has undergone a surface treatment, said surface treatment being a chemical attack, brushing, hydration, sandblasting, shot peening, a physicochemical treatment of the plasma or corona or laser type, a chemical activation or a combination thereof.

13. The method for manufacturing a coated cooking element according to claim 1, wherein the PTFE polymer is the only polymer in the layer.

14. The method for manufacturing a coated cooking element according to claim 1, wherein said one or more thermoplastic polymer(s) different from PTFE of the layer are selected from:

tetrafluoroethylene and perfluoropropylvinylether (PFA) copolymers, tetrafluoroethylene and hexafluoropropene (FEP) copolymers, polyvinylidene fluoride (PVDF), tetrafluoroethylene and polymethylvinylether (MVA) copolymers, tetrafluoroethylene, polymethylvinylether and fluoroalkylvinylether (TFE/PMVE/FAVE) terpolymers, ethylene tetrafluoroethylene (ETFE), polyarylether ketones (PAEK), including polyether ketone (PEK), polyether ether ketone (PEEK), polyether ketone ketone (PEKK), polyether ether ketone ketone (PEEKK), polyether ketone ether ketone ketone (PEKEKK), polyamideimide (PAI), polyimide (PI), polyetherimide (PEI), polybenzymidazole (PBI), poly(phenylene oxide) (PPO), poly(arylethersulfone) (PAES) polymers including polyethersulfone (PES), polyphenylene ether sulfone (PPSU), poly(arylene sulfides) (PAS) including polyphenylene sulfide (PPS), liquid crystal polymers, and mixtures thereof.

15. The method for manufacturing a coated cooking element according to claim 1, wherein said film consists of a single layer that forms a cooking face.

16. The method for manufacturing a coated cooking element according to claim 1, wherein said film further comprises another layer that forms a cooking face, said other layer comprising one or more polymers selected from:

polytetrafluoroethylene (PTFE), tetrafluoroethylene and perfluoropropylvinylether (PFA) copolymers, tetrafluoroethylene and hexafluoropropene (FEP) copolymers, polyvinylidene fluoride (PVDF), tetrafluoroethylene and polymethylvinylether (MVA) copolymers, tetrafluoroethylene, polymethylvinylether and fluoroalkylvinylether (TFE/PMVE/FAVE) terpolymers, ethylene tetrafluoroethylene (ETFE), and mixtures thereof, polyarylether ketones (PAEK), including polyether ketone (PEK), polyether ether ketone (PEEK), polyether ketone ketone (PEKK), polyether ether ketone ketone (PEEKK), polyether ketone ether ketone ketone (PEKEKK), polyamideimide (PAI), polyimide (PI), polyetherimide (PEI), polybenzymidazole (PBI), poly(phenylene oxide) (PPO), poly(arylethersulfone) (PAES) polymers including polyethersulfone (PES), polyphenylene ether sulfone (PPSU), poly(arylene sulfides) (PAS) including polyphenylene sulfide (PPS), liquid crystal polymers, silicone resins, and mixtures thereof.

17. The method for manufacturing a coated cooking element according to claim 16, wherein the film further comprises at least one intermediate layer positioned between the layer and the other layer, said intermediate layer comprising one or more polymers selected from:

polytetrafluoroethylene (PTFE), tetrafluoroethylene and perfluoropropylvinylether (PFA) copolymers, tetrafluoroethylene and hexafluoropropene (FEP) copolymers, polyvinylidene fluoride (PVDF), tetrafluoroethylene and polymethylvinylether (MVA) copolymers, tetrafluoroethylene, polymethylvinylether and fluoroalkylvinylether (TFE/PMVE/FAVE) terpolymers, ethylene tetrafluoroethylene (ETFE), and mixtures thereof, polyarylether ketones (PAEK), including polyether ketone (PEK), polyether ether ketone (PEEK), polyether ketone ketone (PEKK), polyether ether ketone ketone (PEEKK), polyether ketone ether ketone ketone (PEKEKK), polyamideimide (PAI), polyimide (PI), polyetherimide (PEI), polybenzymidazole (PBI), poly(phenylene oxide) (PPO), poly(arylethersulfone) (PAES) polymers including polyethersulfone (PES), polyphenylene ether sulfone (PPSU), poly(arylene sulfides) (PAS) including polyphenylene sulfide (PPS), liquid crystal polymers, silicone resins, and mixtures thereof.

18. The method for manufacturing a coated cooking element according to claim 1, wherein the film further comprises at least one filler and/or at least one reinforcement.

19. The method for manufacturing a coated cooking element according to claim 1, wherein a face of the layer of the film facing the face of the metal substrate in step v) has undergone a mechanical or chemical surface treatment.

20. The method for manufacturing a coated cooking element according to claim 1, wherein a thickness of said film is comprised between 5 μm and 500 μm.

21. The method for manufacturing a coated cooking element according to claim 20, wherein the thickness of said film is comprised between 25 μm and 150 μm.

22. The method for manufacturing a coated cooking element according to claim 1, further comprising a step (a) of press-forming the coated cooking element obtained at the end of step v).

23. The method for manufacturing a coated cooking element according to claim 22, further comprising a step (b) of drawing the coated cooking element obtained at the end of step (a).

* * * * *